3,441,480
METHOD FOR PROGRESSIVE HEATING OF SOLID
PARTICULATE MATERIALS
Thomas E. Ban, Cleveland, Ohio, assignor to McDowell-Wellman Engineering Company, Cleveland, Ohio, a corportion of Ohio
Continuation of application Ser. No. 335,995, Jan. 6, 1964. This application Apr. 3, 1968, Ser. No. 724,673
Int. Cl. C01b 31/04, 47/40
U.S. Cl. 201—22     5 Claims

ABSTRACT OF THE DISCLOSURE

There is provided a process for treating solid particulate materials, preferably in the form of moist compacted particles including depositing a burden of such particles on a moving grate to a depth of from 8 inches to 28 inches, superposing over said burden a capping burden of previously treated compacted particles to form a composite burden, passing the composit eburden through a preheating zone and raising the temperature of the burden at a predetermined rate by passing heated gases through the burden at a predetermined rate; passing the burden in such zone by passing nonoxidizing gases through the composite burden at a predetermined rate; and then passing the burden through a terminal heating zone to elevate the temperature still further with nonoxidizing gases being passed through the burden at a predetermined rate. The process is particularly useful in graphitizing briquetted powder anthracite coal.

---

This application is a continuation of my prior application, Ser. No. 335,995, filed Jan. 6, 1964, now abandoned.

The present invention relates, as indicated, to a process for the controlled progressive heating of solid particulate materials, and more particularly to a method for thermally inducing physical and/or chemical reactions to take place in a relatively deep bed of briquetted materials.

The present invention has particular utility in the treatment of coal briquettes for the thermal conversion of the carbon therein to the graphite form, and accordingly will be discussed with reference thereto, it being understood that other materials requiring a controlled rate of temperature increase for effecting thermal, physical and/or chemical conversions thereof may be used as well as in the present process. The materials are treated in the form of lumps or briquettes, preferably having a particle size in the range of from about 1″ to about 3″ in average diameter. Briquettes are formed from particulate materials such as are commonly employed, for example in the briquetting of coal or charcoal. Specific materials include, therefore, powdered anthracite coal, powdered bituminous coal, lignite, mixtures of coal with lime, calcium carbide, iron, silicon, tungsten, etc., as particles of composite burden materials, specific examples of which will be given hereinafter.

The formation of graphitic type coke in coke ovens contemplates a large capital investment and a process which is carried out over a ten-hour cycle. The present process effects substantial improvements over such prior processes in providing a continuous processing system which lends itself to automatic control, and provides a time of passage for the material through the system of approximately one hour as compared with the normal ten-hour cycle. Still further, higher temperatures are obtainable for firing which in the case of coke formation enables the production of a more highly graphitized coke.

The present process also enables a more efficient recovery of chemicals out of the flue gas materials because a convenient recycling of the gases enables the enhancement of the concentration of the chemicals in the flue gases so that recovery of such chemicals involves only moderate size apparatus instead of the massive recovery apparatus presently employed.

It is necessary to control the gain in temperature, particularly in the case of transformation from one crystal line form to another as in the graphitization of carbon, and in the effecting of chemical reaction such as that which occurs between silicon and carbon to form silicon carbide. Furthermore, the materials which are treated in a briquette form usually contain a certain amount of water and volatile materials, the removal of which must be carefully done in order to maintain the briquette form of the material being treated. Finally, unless the temperature is closely controlled, the desired reorientation of the crystal line form of the material does not take place at the efficiency attainable with the present process. Still further, unless the temperature is accurately controlled, the desired physical transformation or the desired chemical transformation may not be achieved.

The present invention may be better understood by having reference to the annexed drawings wherein.

Figure 1:
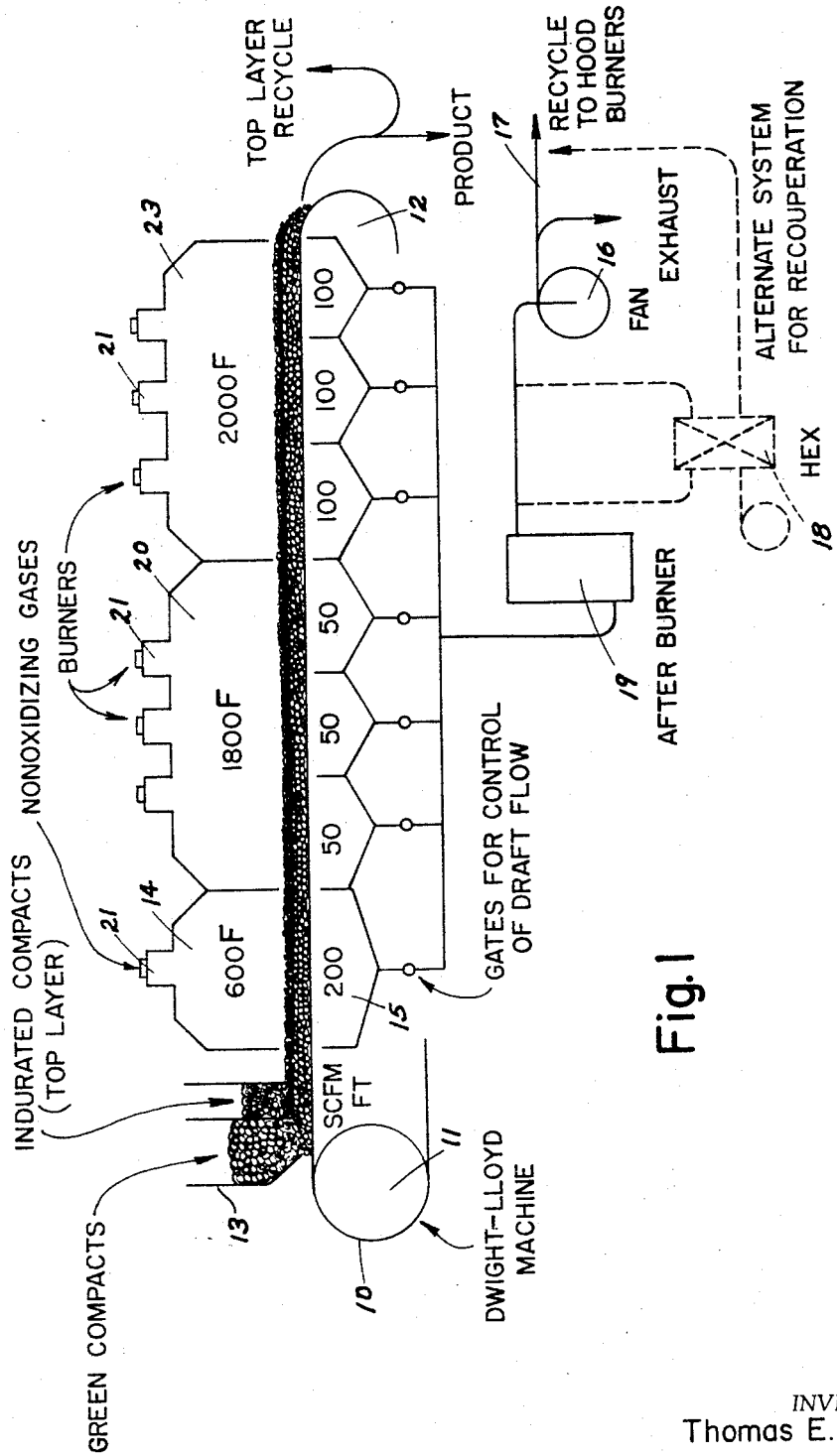
FIG. 1 is a diagrammatic illustration of a conventional traveling grate apparatus showing the processing of compacted or briquetted anthracite coal in acordance with the present process.
Figure 2:
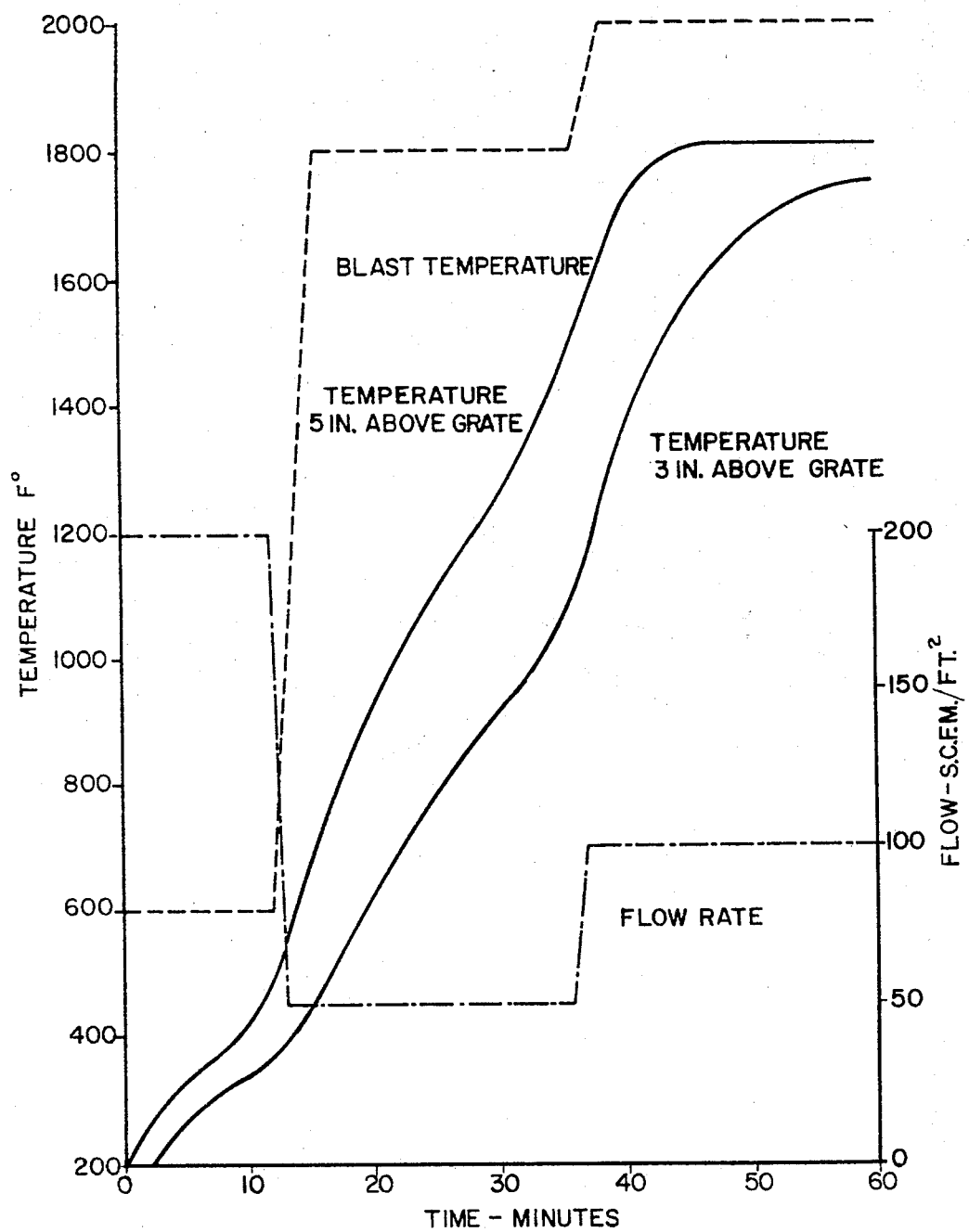
FIG. 2 is a graph of a specific example of graphitizing anthracite coal in which temperature is plotted against time in order to illustrate the relatively constant rate of gain of temperature up to a maximum, the readings being taken at several levels within the composite burden layer, and also showing in broken lines gas flow rates, and in dotted lines the blast temperature.

Briefly stated, the present invention is in a method for heating particulate solid materials in a deep bed at controlled rates of increasing temperature, and which comprises the steps of forming a composite layer or burden of green compacted particles and previously treated compacted particles in superimposed relationship on a traveling grate. The composite burden is passed through three heating zones, a preheating zone, an intermediate heating zone, and a terminal heating zone, the retention time in each of said zones being predetermined, and generally in the range of from about 15 minutes to about 30 minutes. In the preheating zone, the temperature of the burden is raised at a rate of from about 10° F. to about 40° F. per minute to a maximum temperature not in excess of about 650° F., and generally in the range of from about 500° F. to about 650° F. Gases are passed through the composite burden in this zone at a rate of from about 150 standard cubic feet per minute per square foot (s.c.f.m./sq. ft.) to about 250 s.c.f.m./sq. ft. Recycle gases usually tempered by the admission of air, and having a temperature less than about 600° F., were conveniently used. In the intermediate heating zone, the temperature is further increased at substantially the same rate by passing substantially non-oxidizing gases at a temperature in the range of from about 1600° F. to about 1900° F. through the composite burden at a much slower rate, i.e. from about 25 s.c.f.m./sq. ft. to about 75 s.c.f.m./sq. ft. In the terminal heating zone, somewhat hotter gases, i.e. from about 1800° F. to about 2000° F., are passed through the composite burden at a rate of from about 50 s.c.f.m./sq. ft. to about 125 s.c.f.m./sq. ft. to continue the increase of thermal energy in the composite burden at about the same rate. The gases passing through the preheating zone may be oxidizing in nature, i.e. containing more than about 10% of free oxygen in the gases, or nonoxidizing. Because the temperature in the preheating zone is kept to a maximum of about 650° F., no ignition of oxidation occurs, even with "oxidizing" gases, e.g. air. If the temperature in the preheating zone were allowed to exceed about 650° F., ignition under oxidizing conditions might occur.

The gases in the intermediate heating zone and the terminal heating zone, particularly in the case of oxidation sensitive reactant materials, for example coal, are desirably nonoxidizing, and preferably contain no more than about 2% oxygen, preferably 0% oxygen, and in certain instances preferably decidedly reducing in that they contain from 3% to 4% carbon monoxide. The gases used in the preheating zone may contain from 0% oxygen to the oxygen content of ambient air, but are preferably recycle gases which generally contain less oxygen than ambient air.

Following the controlled heating of the particulate materials, the composite burden may enter a soaking zone where the temperature is maintained at a predetermined level for a period of time sufficient to carry out a desired transformation or chemical reaction. The soaking period may vary from 5 to 30 minutes.

Whether or not a soaking period is used, the product issuing from the end of the traveling grate may be allowed to cool spontaneously in the air to room temperature, or more desirably, it may be quenched by dumping into water.

Conservation of heat energy in the system is desirably practiced by recycling the gases wherever possible. Thermal energy is imparted to the gases by burning natural gas in the gas stream.

Referring now more particularly to FIG. 1, there is here shown in diagrammatic form a representation of a traveling grate machine of conventional structure, the traveling grate being represented by the endless line 10 co-operating with terminal sprockets 11 and 12, one of which is driven and the other of which follows and provides a trackway for a plurality of individual pallets, the bottoms of which are formed from grate bars in the usual manner.

The material which is to be treated in accordance with this process is, as indicated above, desirably a compacted or briquetted material formed by the high pressure compacting of a powdered particulate material, e.g. powdered anthracite coal, powdered bituminous coal, powdered coke, coke breeze, and compositions including these materials such as coal-limestone mixtures, coal-limestone, iron ore compositions, etc. Compacts of these materials are not usually self-supporting, and accordingly it is desirable to include a minor percentage of a binder material such as tar. A suitable composition for coal contains 95% to 90% of powdered coal of either of the anthracite or bituminous type, and from 5% to 10% of a liquid tar of the asphaltic type as a binder. Asphalt emulsion may be used in pelletizing these materials on a conventional balling apparatus of the inclined rotating pan type, for example. The amount of such asphalt emulsion which is used is that which is sufficient to supply from 5% to 10% by weight of liquid asphaltic type tar as a binder for the ultimate pellet, the lower percentages being preferred. These compositions in the preferred case are hydraulically pressed or rolled to provide a pressure briquetted material.

The tar bound coal briquette materials are then screened for an average size of from 1″ to 3″ in average diameter, and the classified briquettes deposited by any suitable means on the traveling grate machine. The depth to which the briquettes are loaded on the machine may vary from 8″ to 28″, a usual depth being in the range of from 12″ to 24″, and specifically 18″ deep.

In order to prevent local overheating of the layer of briquettes first contacted by the hot gases, there is provided a capping layer of previously processed briquettes of the same composition. This blanket or capping layer will have a depth which will vary from 2″ to 8″ and specifically about 3″ to 4″ deep. Depending upon the direction of passage of the gases through the burden, the capping layer may be on the bottom where the gases are passed upwardly through the burden, on the top where the gases are passed downwardly through the burden, and on both the top and bottom of the burden where it is desired for operational reasons to employ both downdraft and updraft treatment of the composite burden. The composite burden will be understood as comprising the green compacted particles which have not been treated and the capping layer or layers of previously treated material. In the least complicated embodiment of the present invention, the gases are passed downwardly through the composite burden in each of the heating zones, hereinafter more particularly described, and hence the capping layer is provided in superimposed relationship on the top surface of the burden to be treated in the process. Suitable grating as provided by the hopper 13 controls the depth of the respective layers. The shape and density of the briquettes will have some influence on the necessity and extent of the blanket layer. Pillow type briquettes tend to spall, and consequently, a deeper capping layer is required to disperse and distribute the incoming hot gases in order to prevent intolerable thermal shock which would promote such spalling of the briquettes. The "donut" type of compacted briquettes do not seem quite as subejct to spalling, there being a larger relative surface area for a unit weight thereof.

The composite burden then enters a preheating zone by passing between a gas admitting hood 14 superimposed over the grate and a windbox 15 disposed beneath the traveling grate and co-operating with hood 14. Gases which may be "oxidizing" or "nonoxidizing" are drawn downwardly through the bed by means of fan 16 and recycled by means of return line 17 to the hood. Heat may be extracted at heat exchanger 18 for the purpose of tempering the hot gases. The retention time in the preheating zone ranges from 15 minutes to 30 minutes and is sufficient to raise the temperature of the composite burden to about 600° F. Temperatures in the preheating zone should not be permitted to exceed about 650° F. because at this temperature, a carboniferous material will ignite, particularly where the gases are of the oxidizing type. Generally, the temperature of the draft is below about 600° F. and the rate at which the gas is passed through is relatively quite high being in the neighborhood of from 150 s.c.f.m./ sq. ft. to 250 s.c.f.m./sq. ft., and generally 200 s.c.f.m./ sq. ft. As indicated, a heat exchanger, or air, may be bled into the line to temper the temperature of the gases so that the conditions which prevail in the preheating zone are, relative to the conditions in the remaining heating zones, quite oxidizing.

Following the preheating zone, the composite bed enters an intermediate heating zone where the temperature is raised at substantially the same rate, i.e. 10° F.–40° F. per minute in the material being treated. This elevation of temperature of the burden is accomplished by passing gases through the bed, preferably downwardly, the temperature of these gases being generally in the range of 1600° F. to 1900° F. and preferably in the neighborhood of about 1800° F. The retention time in the intermediate heating zone is about the same as the retention time in the preheating zone, i.e. 15–30 minutes. Because of the very much higher temperature of the gases, it is not necessary that the rate of gas passage through the composite burden be as high as in the preheating or drying zone. Thus, a rate of gas passage of from 25 s.c.f.m./sq. ft. to 75 s.c.f.m./sq. ft. is sufficient to effect an increase in the heat content or temperature of the composite burden within the range of from 10° F. to 40° F. per minute.

The gases which are utilized in the intermediate heating zone, and in the terminal heating zone, are, as indicated above, nonoxidizing gases. The oxygen content of these gases should be no more than about 2% by volume. Still more preferably, the gases should be slightly reducing, i.e. contain from about 2% to about 5% by volume of carbon monoxide, and especially 3%–4% carbon monoxide by volume.

The gases exiting from the bottom of the bed in the intermediate heating zone are co-mingled with the gases exiting from the bottom of the bed in the terminal heating zone. These are then passed through an afterburner 19 where additional heat is imparted to the gases to raise the temperature of the gases to a maximum of about 2200° F. Thereafter, a heat exchanger or throttling means to introduce air or gases from the preheating zone into the hot gases for purposes of regulating the temperature may be employed. Thus, the temperature of the gases entering the intermediate heating zone should be about 1800° F., and those entering the terminal heating zone should be about 2000° F. Gas burners, such as burners 21 extending into the hoods 20 and 23, respectively, may also be used to regulate the temperature of the gases in such hoods. Instead of an afterburner 19, there may be provided a recovery apparatus for the extraction of chemicals carried in the gas stream exiting from the bottom of the bed in the intermediate heating zone and the terminal heating zone. When these gases are recirculated as by fan 16 in the system as shown in FIG. 1, the concentration of chemicals carried in the gas stream is continuously increased so that when extraction means are supplied, relatively small apparatus can be used to extract the high concentration of chemicals carried in the gas stream. In normal procedures, a large volume of gas which has passed through the reactant material zone only once must be handled in order to extract relatively small concentrations of chemicals carried thereby. Recirculation accompanied by increased concentration effects considerable saving in the capital investment for recovery apparatus and improves the efficiency of the extraction process.

As indicated above, the composite bed then enters a terminal heating zone in which zone the time of passage is again from 15 to 30 minutes. In the final heating zone the temperature is further increased at the same relative rate of from 10° F. to 40° F. per minute until the maximum desired temperature of the material undergoing treatment has been reached. Most usually, this temperature is a composite bed temperature of about 1800° F. In order to achieve this temperature in the composite bed, the gases have a temperature about 200° in excess thereof, e.g. 2000° F., which temperature has been arrived at such as by the addition of auxiliary heat through an auxiliary gas burner mounted in the hood. Instead of mounting the gas burner in the hood as shown diagrammatically in FIG. 1, the gas burner may be in the line at a point remote from the hood.

The rate of passage of the gases through the terminal heating zone is somewhat higher than that through the intermediate heating zone, i.e. from 50 s.c.f.m./sq. ft. to 125 s.c.f.m./sq. ft.

In the passage of gases through particulate burdens in the manner set forth for the respective zones above described, there is formed a heat front which gradually progresses through progressive strata of the burden to elevate the temperature of the burden along such heat front at the rates indicated above. A reversal of the direction of the flow of the gases causes a reversal in the direction or profile of the heat front. Thus as the burden is moving longitudinally on the traveling grate, the heat front will follow a profile depending upon the direction of the flow of the gases which extends diagonally from the surface first contacted by the gases forwardly and toward the opposite surface of the burden. The colder portion of the burden will be upstream of the burden (i.e. toward the inlet extremity of the traveling grate machine) where the gases are increasing the heat content of the burden in progressive incremental layers of the burden or "progressive strata," and downstream of the heat profile when the gases are abstracting heat from the burden. The heat front represents that line extending diagonally forwardly through the burden where burden temperatures are substantially the same. Temperatures vertically above or below the heat front will be either above or below the temperatures along the heat front in successive layers of the burden depending upon whether heat is being supplied to the burden by the gases or abstracted therefrom.

If it has been determined that the amount of time necessary to effect the desired transition in the material being treated in accordance with this process has been accomplished at the end of the three heating zones, the material may then be quenched by dumping into cold water. On the other hand, if preliminary determinations have shown that a longer period of time is required, the traveling grate machine may be extended to provide a soaking zone where no effort is made to increase the temperature above the maximum temperature reached in the terminal heating zone. In such a case, the gases may have a temperature regulated to just slightly above the temperature of the bed as it exits from the terminal heating zone to account for heat losses through the equipment, such gases being passed through the bed at substantially the rate of from 25 s.c.f.m./sq. ft. to 100 s.c.f.m./sq. ft. The length of time in the soaking zone will depend upon the nature of the transformation which is desired in the product being treated, and may range from a few minutes to several hours. In the case of anthracite coal, it has been found that a soaking period is not necessary to form a graphite carbon material.

As indicated above, other materials may provide partials of the entire composition treated in accordance with the present invention. Thus, for example, there may be limestone admixed with the carbonaceous material for providing a reducing and fluxing pellet for use in steel-making processes. The amount of lime admixed with the carbon in this composition will be in the same proportion as the lime bears to the coal or coke in a normal steel-making operation. In like manner, silicon and tungsten ores may be admixed in the composition for purposes of reduction to the metal by chemical action of the carbon with the oxygen of the metal oxide so as to provide a partially metallized briquette which may be used in further steel-making operations.

Chemicals contained in the flue gases may, as indicated above, be concentrated by recirculation of the gases repeatedly through the composite burden. When the concentration has reached a suitable level, a portion of the gases may be diverted for passage through a scrubbing tower, for example, in order to remove coal tar products. The higher concenrtation of these products in the gases enables more efficient and economical recovery.

There has thus been provided an improved process for the heat treatment of solid particulate material which has been compressed or compacted into the form of briquettes whereby the heat content of such material can be gradually increased at a predetermined rate to a high temperature sufficient to initiate and sustain a transition within the body of the briquette of either a physical or a chemical nature, or a combination of both. Primarily, the process is of utility in carbonizing coal to make coke.

What is claimed is:

1. A method for treating green compacted particles of solid material in a deep bed at controlled rates of increasing temperature which comprises the steps of:
    (a) depositing a burden of green compacted particles of solid material on a moving grate to a depth of from about 8" to about 28";
    (b) laminating said burden with a capping burden of previously treated compacted particles of substantially the same initial composition to a depth of from about 2" to about 8" to form a composite burden;
    (c) passing said composite burden through a preheating zone for a period of from about 15 minutes to about 30 minutes;
    (d) raising the temperature of progressive strata of burden in said preheating zone at from 10° F. to 40° F. per minute by passing heated substantially nonoxidizing gases at a temperature of from about 500° F. to about 650° F. through said composite burden at a rate of from about 150 s.c.f.m./sq. ft. to about 250 s.c.f.m./sq. ft.;
    (e) passin gsaid composite burden through an intermediate heating zone for a period of from about 15 minutes to about 30 minutes;
    (f) raising the temperature of progressive strata of said composite burden in said intermediate heating zone from 10° F. to 40° F. per minute by passing substantially nonoxidizing gases at a temperature of from about 1600° F. to about 1900° F. through said composite burden at a rate of from about 25 s.c.f.m./sq. ft. to about 75 s.c.f.m./sq. ft.

(g) passing said composite burden through a terminal heating zone for a period of from about 15 minutes to about 30 minutes; and (h) raising the temperature of progressive strata of said composite burden in said terminal heating zone at from 10° F. to 40° F. per minute by passing substantially nonoxidizing gases at a temperature of from about 1800° F. to about 2000° F. through said composite burden at a rate of from about 50 s.c.f.m./sq. ft. to 125 s.c.f.m./sq. ft.

2. The method of claim 1 in which the gases from each of the zones are co-mingled and recycled to each of said zones for passage through said composite burden.

3. The method of claim 1 in which the gases passing through each of the heating zones contain no more than 2% by volume of free oxygen.

4. The method of claim 1 in which the gases passing through each of the heating zones contain from about 2% to about 5% by volume of carbon monoxide.

5. The method of graphitizing green compacted briquettes of powdered anthracite coal in a deep bed at a controlled rate of increasing temperature which comprises the steps of:

(a) depositing a burden of green compacted briquettes of powdered anthracite coal on a moving grate to a depth of between 12″ and 24″, said briquettes having an average particle size in the range of from 1″ to 3″ in diameter;

(b) laminating said burden with a capping burden of graphitized briquettes of substantially the same initial composition to a depth of from about 3″ to 4″ to form a composite burden;

(c) passing said composite burden through a preheating zone for a period of from about 15 minutes to about 30 minutes;

(d) raising the temperature of progressive incremental strata of said composite burden in said preheating zone at a rate of at from 10° F. to 40° F. per minute by passing heated substantially nonoxidizing gases at a temperature of about 600° F. downwardly through said composite burden at a rate of about 200 s.c.f.m./sq. ft.;

(e) passing said composite burden through an intermediate heating zone for a period of from about 15 minutes to about 30 minutes;

(f) raising the temperature of progressive strata of said composite burden in said intermediate zone at from 10° F. to 40° F. per minute by passing substantially nonoxidizing gases at a temperature of about 1800° F. downwardly through said composite burden at a rate of about 50 s.c.f.m./sq. ft.;

(g) passing said composite burden through a terminal heating zone for a period of from about 15 minutes to about 30 minutes;

(h) raising the temperature of progressive layers of said composite burden in said terminal heating zone at a rate of from 10° F. to 40° F. per minute by passing substantially nonoxidizing gases at a temperature of about 2000° F. downwardly through said composite burden at a rate of about 100 s.c.f.m./sq. ft.; and (i) recovering graphitized briquettes.

References Cited

UNITED STATES PATENTS

| | | |
|---|---|---|
| 1,906,755 | 5/1933 | Karrick. |
| 1,918,162 | 7/1933 | Willson. |
| 2,955,991 | 10/1960 | Tufty. |
| 3,009,863 | 11/1961 | Angevine. |

FOREIGN PATENTS 707,583    4/1954    Great Britain.

NORMAN YUDKOFF, *Primary Examiner.*

D. EDWARDS, *Assistant Examiner.*

U.S. Cl. X.R.

23—290.4; 44—10; 201—27, 32, 40